(12) United States Patent
Kyung

(10) Patent No.: US 10,268,432 B2
(45) Date of Patent: Apr. 23, 2019

(54) METHOD AND APPARATUS FOR GENERATING WATCH SCREEN DESIGN FOR SMART WATCH

(71) Applicant: APPOSTER INC., Seoul (KR)

(72) Inventor: Sung Hyun Kyung, Seoul (KR)

(73) Assignee: APPOSTER INC., Seoul (KR)

( * ) Notice: Subject to any disclaimer, the term of this patent is extended or adjusted under 35 U.S.C. 154(b) by 337 days.

(21) Appl. No.: 15/347,929

(22) Filed: Nov. 10, 2016

(65) Prior Publication Data

US 2018/0107365 A1 Apr. 19, 2018

(30) Foreign Application Priority Data

Oct. 19, 2016 (KR) .................. 10-2016-0135991

(51) Int. Cl.
*G06F 3/00* (2006.01)
*G06F 3/14* (2006.01)
*G06F 3/147* (2006.01)
*G09G 5/14* (2006.01)

(52) U.S. Cl.
CPC ............. *G06F 3/14* (2013.01); *G06F 3/147* (2013.01); *G06F 3/1454* (2013.01); *G09G 5/14* (2013.01); *G09G 2370/042* (2013.01); *G09G 2370/16* (2013.01)

(58) Field of Classification Search
CPC ...... G06F 3/04845; G06F 21/32; G06F 1/163; G04G 17/08; G04G 9/0064; G04G 9/007; G04G 21/00; G04G 9/00; G04F 10/00; H04N 21/8173; H04M 1/7253
See application file for complete search history.

(56) References Cited

U.S. PATENT DOCUMENTS

| 8,055,602 | B2 | 11/2011 | Tirpak et al. | |
| 8,775,976 | B2 | 7/2014 | Moon | |
| 9,565,291 | B2 | 2/2017 | Heo et al. | |
| 2012/0092383 | A1* | 4/2012 | Hysek | G04G 9/00 345/684 |

(Continued)

FOREIGN PATENT DOCUMENTS

KR 10-2011-0020836 A 3/2011
KR 10-1472127 B1 12/2014

(Continued)

OTHER PUBLICATIONS

An Office Action issued by the Korean Patent Office dated Mar. 9, 2018, which corresponds to Korean Patent Application No. 10-2016-0135991 and is related to U.S. Appl. No. 15/347,929.

*Primary Examiner* — Toan H Vu
(74) *Attorney, Agent, or Firm* — Studebaker & Brackett PC

(57) ABSTRACT

Method and apparatus for generating screen design are provided, in some embodiments, one of methods comprises, determining at least one user-preferred watch screen design from previously-registered watch screen designs based on at least one of a watch screen design evaluation history and a watch screen design generation history of a user, acquiring tag information previously-matched to each element included in the at least one user-preferred watch screen design, determining elements to be included in a random watch screen design based on the acquired tag information, and generating the random watch screen design by combining the determined elements.

15 Claims, 10 Drawing Sheets

(56) References Cited

U.S. PATENT DOCUMENTS

| | | | | |
|---|---|---|---|---|
| 2012/0274508 | A1* | 11/2012 | Brown | G04F 10/00 342/357.25 |
| 2012/0304229 | A1* | 11/2012 | Choi | H04N 21/8173 725/41 |
| 2014/0068494 | A1* | 3/2014 | Petersen | H04M 1/7253 715/778 |
| 2016/0034152 | A1* | 2/2016 | Wilson | G06F 3/04845 715/835 |
| 2016/0054710 | A1* | 2/2016 | Jo | G04G 21/00 715/763 |
| 2016/0054892 | A1* | 2/2016 | Kim | G04G 9/007 715/808 |
| 2016/0091867 | A1* | 3/2016 | Mansour | G06F 1/163 368/294 |
| 2016/0216694 | A1* | 7/2016 | Kneebusch | G04G 17/08 |
| 2016/0357386 | A1* | 12/2016 | Choi | G04G 9/0064 |
| 2017/0235935 | A1* | 8/2017 | Song | G06F 21/32 726/19 |

FOREIGN PATENT DOCUMENTS

| | | |
|---|---|---|
| KR | 10-2015-0015631 A | 2/2015 |
| KR | 10-2015-0081151 A | 7/2015 |
| KR | 10-2016-0024323 A | 3/2016 |
| KR | 10-1633824 B1 | 6/2016 |
| KR | 10-2016-0092442 A | 8/2016 |
| KR | 101686451 B1 | 12/2016 |

* cited by examiner

RECOMMENDED TAGS          *SELECT TWO OR MORE TAGS

☐ classic    ☐ metallic    ☐ retro      ☐ pattern
☐ nature     ☐ city        ☐ universe   ☐ animal
☐ trip       ☐ celebrity   ☐ music      ☐ sports
☐ vehicle    ☐ animation   ☐ cartoon    ☐ game
☐ love       ☐ family      ☐ black      ☐ white

METHOD AND APPARATUS FOR GENERATING WATCH SCREEN DESIGN FOR SMART WATCH

This application claims priority to Korean Patent Application No. 10-2016-0135991, filed on Oct. 19, 2016, and all the benefits accruing therefrom under 35 U.S.C. § 119, the of which is incorporated herein by reference in its entirety.

BACKGROUND disclosure

1. Field

The present disclosure relates to a method and apparatus for generating a watch screen design for a smart watch, and more particularly, to a method and apparatus for automatically generating a watch screen design to be applied to a smart watch by automatically determining elements for forming the watch screen design.

2. Description of the Related Art

Wearable devices, which can be worn by users to communicate with external devices and can display various information, have been developed. Wearable devices have come in various types such as a wristwatch-type smart watch, a glass-type head mounted display (HMD), or the like, and various wearable device manufacturers provide their own unique user interfaces.

Smart watch manufacturers, in particular, provide their own unique watch screen designs. Thus, when using a smart watch, users may determine one of a number of watch screen designs provided, and set in advance, by the manufacturer of the smart watch.

However, the number and the types of watch screen designs provided by each smart watch manufacturer are generally limited and cannot fully reflect users' tastes.

Also, methods have not yet been developed for allowing users to design a watch screen and apply it to their smart watch or for automatically generating a watch screen design based on user information. Also, methods have not yet been developed for generating a watch screen design for providing an interface associated with a particular function of a smart watch.

SUMMARY

Exemplary embodiments of the present disclosure provide a method and apparatus for automatically generating a watch screen design for a smart watch based on user information.

More specifically, exemplary embodiments of the present disclosure provide a method and apparatus for automatically generating a watch screen design based on user information such as a user's profile information and histories of searching, generating, and applying watch screen designs.

Exemplary embodiments of the present disclosure also provide a method and apparatus for automatically generating a watch screen for a user's smart watch based on watch screen designs generated by multiple other users.

More specifically, exemplary embodiments of the present disclosure also provide a method and apparatus for applying different weighted values to different types of elements included in watch screen designs generated by multiple users and generating a watch screen design based on the weighted values.

Exemplary embodiments of the present disclosure also provide a method and apparatus for automatically changing settings regarding at least some of the elements of a watch screen generated based on information collected via a smart watch and/or information entered by a user.

However, exemplary embodiments of the present disclosure are not restricted to those set forth herein. The above and other exemplary embodiments of the present disclosure will become more apparent to one of ordinary skill in the art to which the present disclosure pertains by referencing the detailed description of the present disclosure given below.

According to an exemplary embodiment of the present disclosure, a method comprises determining at least one user-preferred watch screen design from previously-registered watch screen designs based on at least one of a watch screen design evaluation history and a watch screen design generation history of a user, acquiring tag information previously-matched to each element included in the at least one user-preferred watch screen design, determining elements to be included in a random watch screen design based on the acquired tag information, and generating the random watch screen design by combining the determined elements.

According to other exemplary embodiment of the present disclosure, a method comprises determining elements from a plurality of previously-registered watch screen design elements in response to a request input for a generation of a random watch screen design, generating the random watch screen design by combining the determined elements, and providing the random watch screen design to a smart watch connected to the apparatus via a network interface, in response to a selection input for the random watch screen design.

According to another exemplary embodiment of the present disclosure, an apparatus comprises one or more processors, a memory loading a computer program to be executed by the processors, a storage storing watch screen design elements and previously-generated watch screen designs, and a network interface providing the previously-generated watch screen designs to a smart watch, wherein the computer program comprises an operation for determining at least one user-preferred watch screen design from previously-generated watch screen designs based on at least one of a watch screen design evaluation history and a watch screen design generation history of a user, an operation for acquiring tag information previously matched to each element included in the at least one user-preferred watch screen design, an operation for determining elements to be included in a random watch screen design based on the acquired tag information, and an operation for generating the random watch screen design by combining the determined elements.

According to exemplary embodiments of the present disclosure, a watch screen design can be provided according to a user's tastes.

In addition, a watch screen design can be automatically generated without the need to receive settings regarding each element for forming the watch screen design from a user.

Moreover, a smart watch whose watch screen design changes according to a user's environment can be provided.

Other features and exemplary embodiments may be apparent from the following detailed description, the drawings, and the claims.

BRIEF DESCRIPTION OF THE DRAWINGS

The above and other exemplary embodiments and features of the present disclosure will become more apparent by describing in detail exemplary embodiments thereof with reference to the attached drawings, in which:

FIG. 8 illustrates tag information;

DETAILED DESCRIPTION

Figure 1:
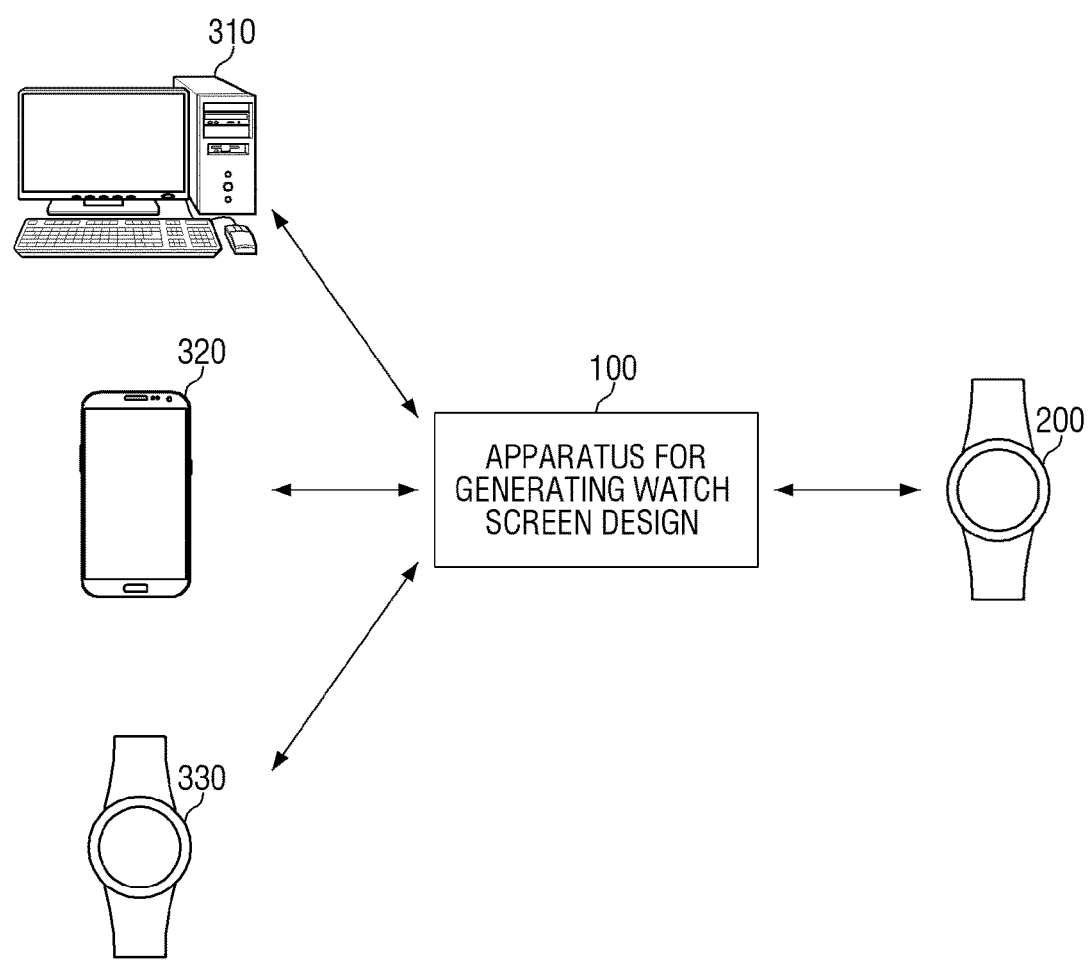
FIG. 1 is a configuration view of a system for generating a screen design for a smart watch according to an exemplary embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different provides and should not be construed as being limited to the embodiments set forth herein. Rather, these embodiments are provided so that this disclosure will be thorough and complete and will fully convey the concept of the present disclosure to those skilled in the art, and the present disclosure will only be defined by the appended claims. Like reference numerals refer to like elements throughout the specification.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terminology used herein is for the purpose of describing particular embodiments only and is not intended to be limiting. As used herein, the singular forms "a," "an," and "the" are intended to include the plural forms, including "at least one," unless the content clearly indicates otherwise.

The structure and the operation of a system for generating a watch screen design, which performs a method of generating a watch screen design, will hereinafter be described with reference to FIG. 1. FIG. 1 is a configuration view of a system for generating a watch screen design for a smart watch according to an exemplary embodiment of the present disclosure.

Referring to FIG. 1, the system may include an apparatus 100 for generating a watch screen design, a smart watch 200, and external devices. FIG. 1 illustrates a first terminal 310, a second terminal 320, and a smart watch 330 as examples of the external devices. The apparatus 100, the smart watch 200, the first terminal 310, the second terminal 320, and the smart watch 330 are computing devices capable of communicating with one another. The smart watch 200, the first terminal 310, the second terminal 320, and the smart watch 330 may be used by different users.

The apparatus 100 may provide an interface for generating a watch screen design for a smart watch to a user of the smart watch 200 and users of the external devices. The apparatus 100 may include a display unit and an input unit and may provide the interface for generating a watch screen design to a user (hereinafter "the user") of the apparatus 100 and other users via the display unit and the input unit.

Alternatively, the apparatus 100 may provide the interface for generating a watch screen design to the smart watch 200, the first terminal 310, the second terminal 320, and the smart watch 330, in which case, the user and other users may generate a watch screen design via the interface for generating a watch screen design, provided to their respective devices.

In response to an input for generating a watch screen design being received from the user, the apparatus 100 may generate a random watch screen design. The apparatus 100 may display the generated random watch screen design and may provide the generated random watch screen design to the smart watch 200 according to a selection made by the user.

The structure and the operation of the apparatus 100 will be described later in detail with reference to FIG. 2.

The smart watch 200 may display a watch screen design provided by the apparatus 100.

The smart watch 200 may transmit its user information, its element usage information, which is information regarding the user's usage of each element included in the watch screen design of the smart watch 200, and its feedback information, which is the user's feedback on the watch screen design of the smart watch 200, to the apparatus 100.

Alternatively, the smart watch 200 may receive various information from the user via the interface for generating a watch screen design, provided by the apparatus 100.

The first terminal 310 may be a stationary computing device. For example, the first terminal 310 may be a desktop personal computer (PC). The second terminal 320 may be a portable computing device. For example, the second terminal 320 may be a smartphone. The apparatus 100 may provide each watch screen design generated therein not only to the smart watches 200 and 330, but also to computing devices such as the first and second terminals 310 and 320.

The apparatus 100 may receive watch screen designs generated by the first terminal 310, the second terminal 320, and the smart watches 200 and 330. The apparatus 100 may store the received watch screen designs by matching them with their respective user information.

The apparatus 100 may provide an interface for the transaction of previously-registered watch screen designs to the user devices of FIG. 1.

The apparatus 100 will hereinafter be described in detail with reference to FIG. 2. FIG. 2 is a block diagram of an apparatus for generating a screen design for a smart watch according to an exemplary embodiment of the present disclosure.

Figure 2:
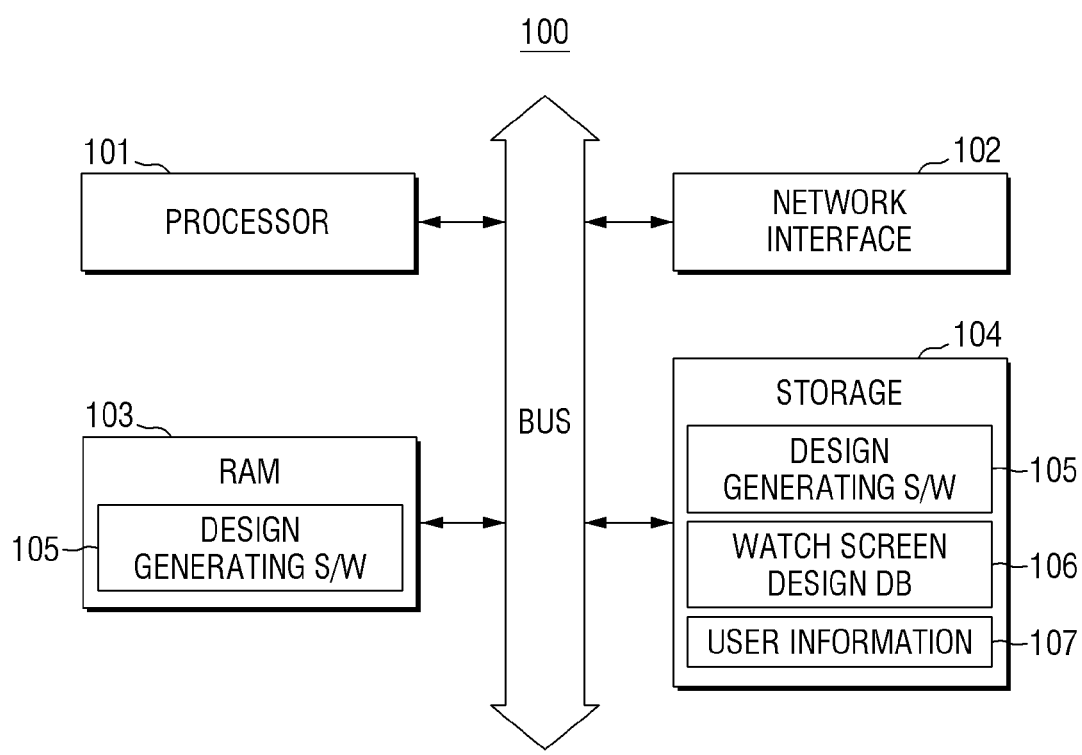
FIG. 2 is a block diagram of an apparatus for generating a screen design for a smart watch according to an exemplary embodiment of the present disclosure.

Referring to FIG. 2, the apparatus 100 may include a processor 101, a network interface 102, a memory 103, and a storage 104.

The processor 101 controls the general operation of each of the elements of the apparatus 100. The processor 101 may be configured to include a central processing unit (CPU), a micro processing unit (MPU), a micro controller unit (MCU), or an arbitrary type of processor that is already well known in the art to which the present disclosure pertains. The processor 101 may perform computation in connection with at least one application or program for executing a method of generating a watch screen design for a smart watch according to an exemplary embodiment of the present disclosure and may thus generate various interfaces for performing the method according to an exemplary embodiment of the present disclosure. The apparatus 100 may be equipped with one or more processors.

The network interface 102 supports wired and wireless Internet communication of the apparatus 100. Also, the network interface 102 may support various communication methods other than an Internet communication method. The network interface 102 may be configured to include various communication modules.

The network interface 102 may receive watch screen designs generated by various user devices. Also, the network interface 102 may transmit a randomly generated watch screen design to user devices.

The network interface 102 may provide various interfaces created by the processor 101 to the smart watches 200 and 330, the first terminal 310, and/or the second terminal 320 in the process of generating a watch screen design.

The memory 103 stores various data, commands and/or information. The memory 103 may load at least one program 105 from the storage 104 to perform the method according to an exemplary embodiment of the present disclosure. FIG. 2 illustrates a random access memory (RAM) as an example of the memory 103.

The storage 104 may non-temporarily store data received from an external source. The storage 104 may be configured to include a non-volatile memory such as a read-only memory (ROM), an erasable programmable ROM (EPROM), an electrically erasable programmable ROM (EEPROM), or a flash memory, a hard disk, a removable disk, or a computer-readable recording medium that is already well known in the field to which the present disclosure pertains.

The storage 104 may store at least one program 105 for executing the method according to an exemplary embodiment of the present disclosure. FIG. 2 illustrates design generating software as an example of the program 105. The operation of the apparatus 100 in connection with the execution of the design generating software 105 will be described later with reference to FIG. 3.

The storage 104 may store various settings and information received from the user or from the external devices. More specifically, a watch screen design database 106 and user information 107 may be stored in the storage 104.

A watch screen design generated by the user may be stored in the watch screen design database 106. Also, watch screen designs generated by the external devices such as, for example, the smart watches 200 and 330, the first terminal 310, and the second terminal 320, may be stored in the watch screen design database 106.

The watch screen design database 106 may store elements that form each watch screen design. The watch screen design database 106 may store each of the elements together with tag information. The tag information may include tag information regarding, and included in, each of the elements and tag information indicating a general sense of volume, the texture, and the characteristics of the watch screen design.

For example, a watch screen design may include a background image, a set of hands, an index, one or more sub-dials, and/or text as its elements. For example, tag information of a particular index item may include tag information that can identify the element type of the particular index item from other element types and may also include detailed model information of the particular index item, for example, detailed tag information indicating the model type of the particular index item, such as, for example, index 1 or index 2.

A watch screen design may include various elements depending on whether the watch type is an analog type or a digital type, and each of the various elements may have tag information matched thereto in advance. In a case in which a watch screen design is manually generated, tag information may be matched to each element of the manually-generated watch screen design according to user settings.

The user information 107 may include the user's sex, hobbies, and interests, the model of the smart watch 200, and operating system information of the smart watch 200. Also, the user information 107 may include the user's history of manually generating watch screen designs. That is, the user information 107 may include information regarding the types of watch screen design elements chosen by the user in the process of generating a watch screen design.

The user information 107 may further include the user's history of evaluation watch screen designs generated by other users. That is, the user information 107 may include the user's preferences on watch screen designs generated by other users and may also include information regarding watch screen design elements preferred by the user.

Although not specifically illustrated, the apparatus 100 may further include an input unit, which receives selections of watch screen design elements from the user, and an output unit, which displays a watch screen design generated by the user.

Methods of generating a watch screen design for a smart watch according to exemplary embodiments of the present disclosure will hereinafter be described based on the above description with reference to FIGS. 1 and 2. The exemplary embodiments of the present disclosure that will hereinafter be described may not necessarily be conducted separately or independently, but may be performed in combination of one another or in combination of the exemplary embodiments of FIGS. 1 and 2. It is assumed that the methods according to the embodiments of the present disclosure that will hereinafter be described are performed by the apparatus 100.

Figure 3:
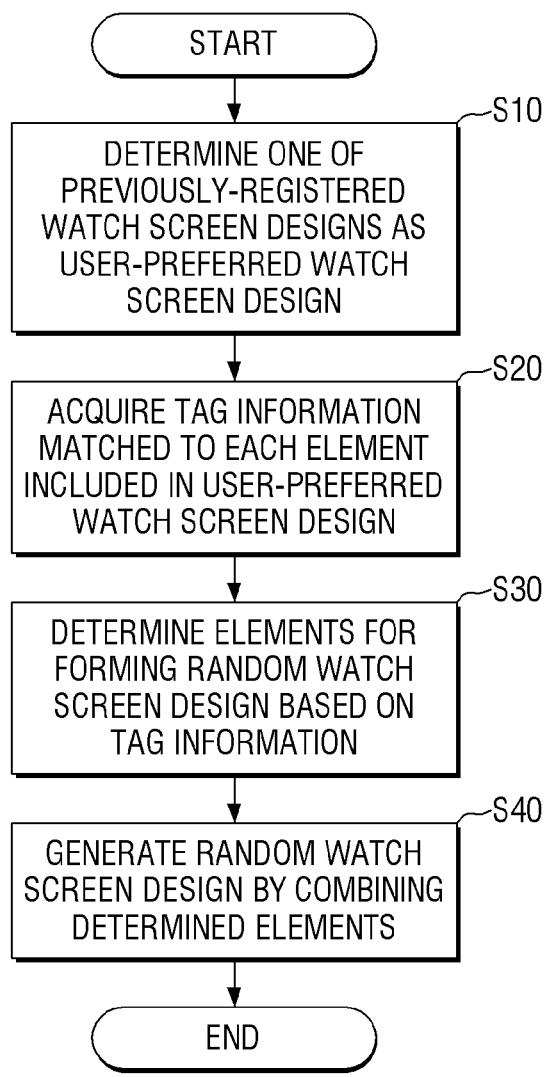
FIG. 3 is a flowchart illustrating a method of generating a screen design for a smart watch according to an exemplary embodiment of the present disclosure.
Figure 4:
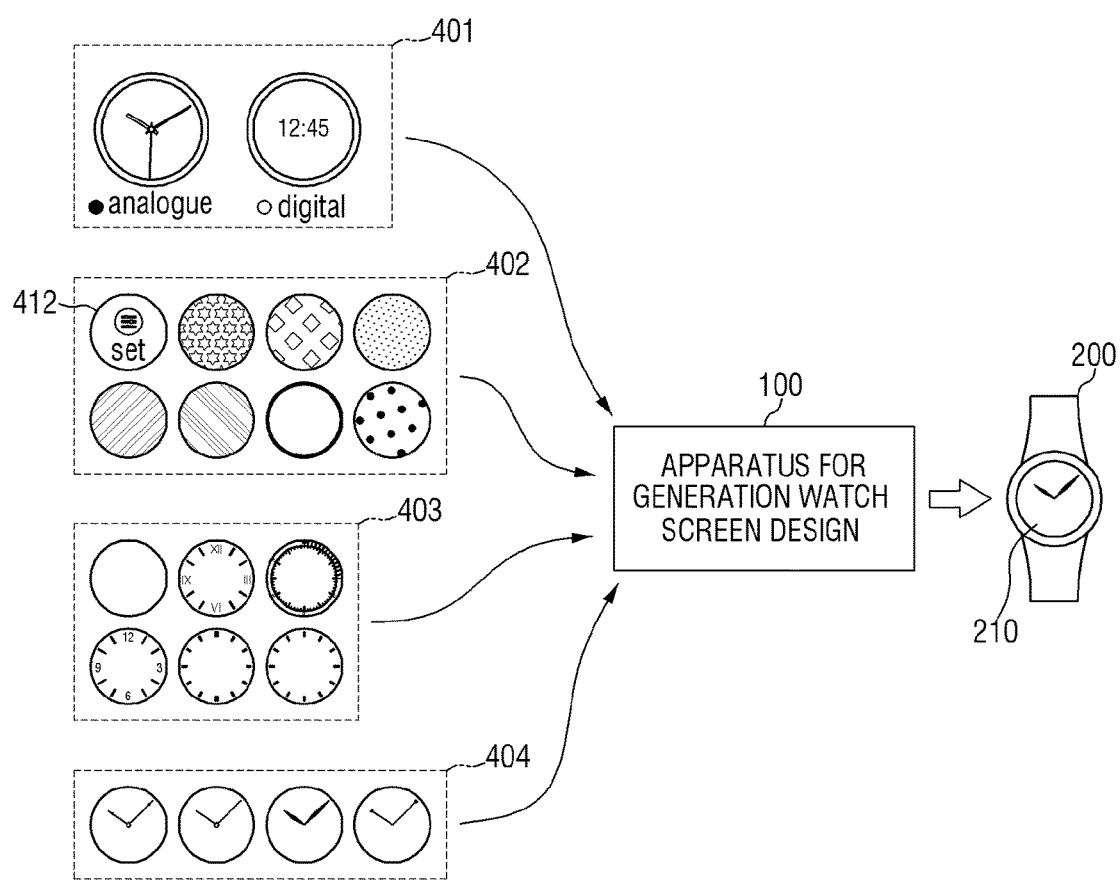
FIG. 4 illustrates elements for forming a watch screen design for a smart watch according to an exemplary embodiment of the present disclosure.

FIG. 3 is a flowchart illustrating a method of generating a screen design for a smart watch according to an exemplary embodiment of the present disclosure. FIG. 4 illustrates watch screen design elements for a smart watch according to an exemplary embodiment of the present disclosure.

Each step of the method of FIG. 3 may be performed by the apparatus 100. The apparatus 100 may receive an input requesting the generation of a random watch screen design from the user via an interface for generating a watch screen design. In response to receipt of the input, the apparatus 100 may provide an interface for generating a random watch screen design to a user terminal. For example, the user terminal may be one of the smart watches 200 and 330, the first terminal 310, and the second terminal 320 of FIG. 1.

Referring to FIG. 3, the apparatus 100 may determine at least one user-preferred watch screen design from among a plurality of previously-registered watch screen designs based on at least one of the watch screen design evaluation history and the watch screen design generation history of the user (S10).

The apparatus 100 may receive an evaluation input for each of the previously-registered watch screen designs via the interface for generating a watch screen design. The apparatus 100 may provide an interface for evaluating a watch screen design to the user terminal.

For example, the interface for evaluating a watch screen design, such as an interface for giving a star rating or a score or a "like" button, may be provided to the user terminal, and the user may evaluate each of the previously-registered watch screen designs present in the apparatus 100 via the interface for evaluating a watch screen design. Alternatively, the apparatus 100 may receive text reviews or evaluations on each of the previously-registered watch screen designs from the user. The previously-registered watch screen designs may be watch screen designs generated by the user, or other users, via the interfaces provided by the apparatus 100. That is, the apparatus 100 may store each generated watch screen design. More specifically, the apparatus 100 may store each watch screen design by matching them with their respective user information.

Also, the apparatus 100 may determine the user-preferred watch screen design based on evaluation information input by the user. The user may generate a watch screen design via the interfaces provided by the apparatus 100. For example, the user may determine elements for forming a watch screen design such as a smart watch model, a watch type, a background image, a set of hands, an index, and one or more sub-dials and may thus generate a watch screen design according to his or her taste.

The apparatus 100 may determine the user-preferred watch screen design based on information regarding each of the determined elements and the watch screen design generated based on the determined elements. The apparatus 100 may determine more than one user-preferred watch screen design.

Once the user determines the user-preferred watch screen design, the apparatus 100 may acquire tag information previously matched to each element that forms the user-preferred watch screen design (S20).

As mentioned above with reference to FIG. 2, a watch screen design has tag information for each element thereof. The apparatus 100 may store tag information for each element of a watch screen design.

Referring to FIG. 4, there may be four types of watch screen design elements, i.e., watch types 401, background images 402, indexes 403, and sets of hands 404. Tag information of each watch screen design element may include an identifier indicating the type of a corresponding watch screen design element and an identifier indicating detailed model information of the corresponding watch screen design element. For example, tag information of an analog watch type may include an identifier "watch type" and an identifier "analog". The tag information of the analog watch type may be expressed as "watch type_analog".

Accordingly, the apparatus 100 may identify the type and the detailed model of each watch screen design element based on the tag information.

More specifically, the apparatus 100 may identify each of the elements included in the user-preferred watch screen design.

Referring again to FIG. 3, the apparatus 100 may determine elements for forming a random watch screen design based on the acquired tag information (S30). That is, the apparatus 100 may determine which of the elements identified from the user-preferred watch screen design are to be included in a random watch screen design to be formed and the detailed model of each of the elements determined to be included in the random watch screen design to be formed. For example, the apparatus 100 may determine a random watch screen design to be formed to be of the analog watch type and to include a background image, an index, and a set of hands, but not to include any sub-dials. More specifically, the apparatus 100 may determine a classic-style analog type corresponding to tag information 1, which is tag information regarding the analog watch type, index 1 corresponding to tag information 2, which is tag information regarding indexes, and hands 3 corresponding to tag information 3, which is tag information regarding sets of hands, as the elements for forming a random watch screen design.

The apparatus 100 may determine the elements for forming a random watch screen design based on, for example, the number of times that tag information has been acquired. That is, the apparatus 100 may set a weighted value for each of the elements included in the user-preferred watch screen design based on the number of times that tag information has been acquired.

For example, it is assumed that a plurality of watch screen designs are determined as user-preferred watch screen designs based on the watch screen design evaluation history or the watch screen design generation history of the user. In a case in which more tag information is acquired for the analog watch type than for other watch types in the plurality of watch screen designs, or the quantity of tag information acquired for the analog watch type exceeds a predefined number, the apparatus 100 may apply a high weighted value to the analog watch type. Also, in a case in which more tag information is acquired for background image 1 than for other background images, or the quantity of tag information acquired for background image 1 exceeds the predefined number, the apparatus 100 may apply a high weighted value to background image 1.

In this manner, the apparatus 100 may apply a weighted value to the detailed model of each of the elements included in each of the plurality of watch screen designs.

The apparatus 100 may determine elements with highest weighted values as the elements for forming a random watch screen design.

The apparatus 100 may generate a random watch screen design by combining the determined elements for forming a random watch screen design. Referring to FIG. 4, the apparatus 100 may transmit the generated random watch screen design to the smart watch 200, and the smart watch 200 may display the received random watch screen design, i.e., a random watch screen design 210.

According to the present exemplary embodiment, a watch screen design may further include one or more sub-dials. Sub-dials may be parts of a watch screen design that display functions other than a basic time display function and show various information such as, for example, temperature, humidity, weather, alarm, and the time in another time zone. Examples of a watch screen design including one or more sub-dials will hereinafter be described.

Figure 5:
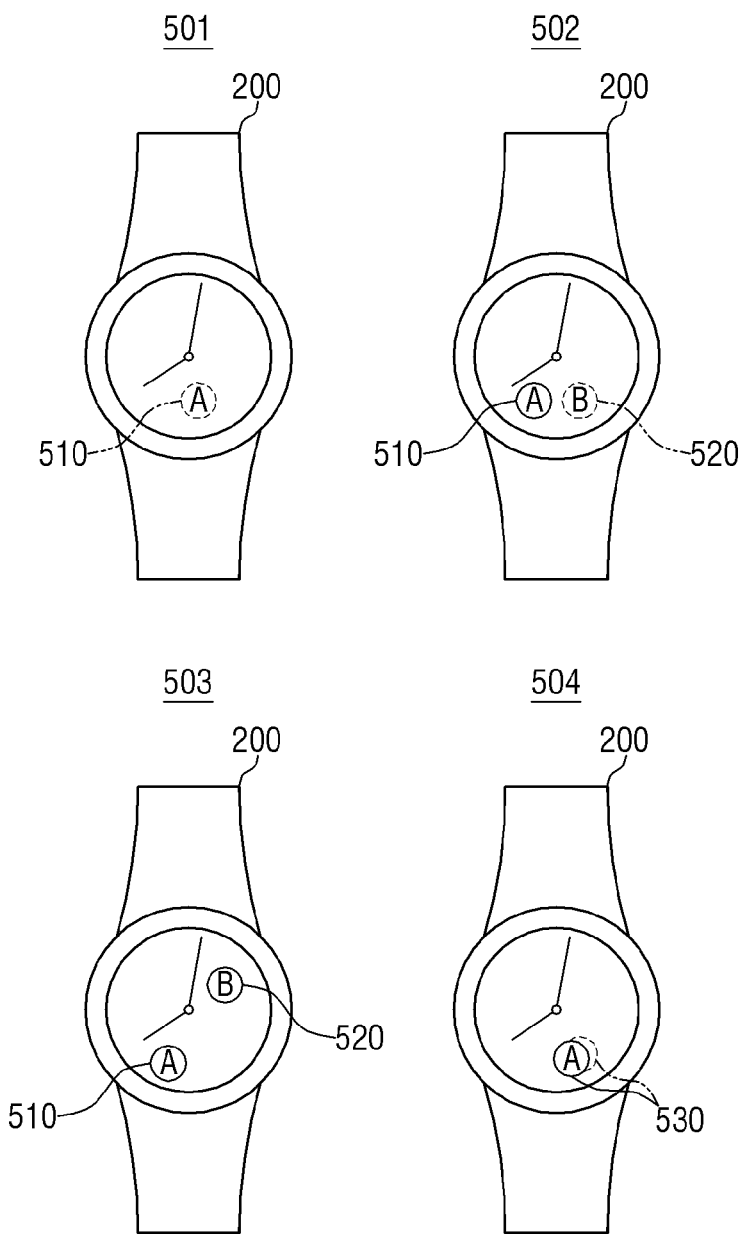
FIG. 5 illustrates a method of determining a display region for a sub-dial.
Figure 6:
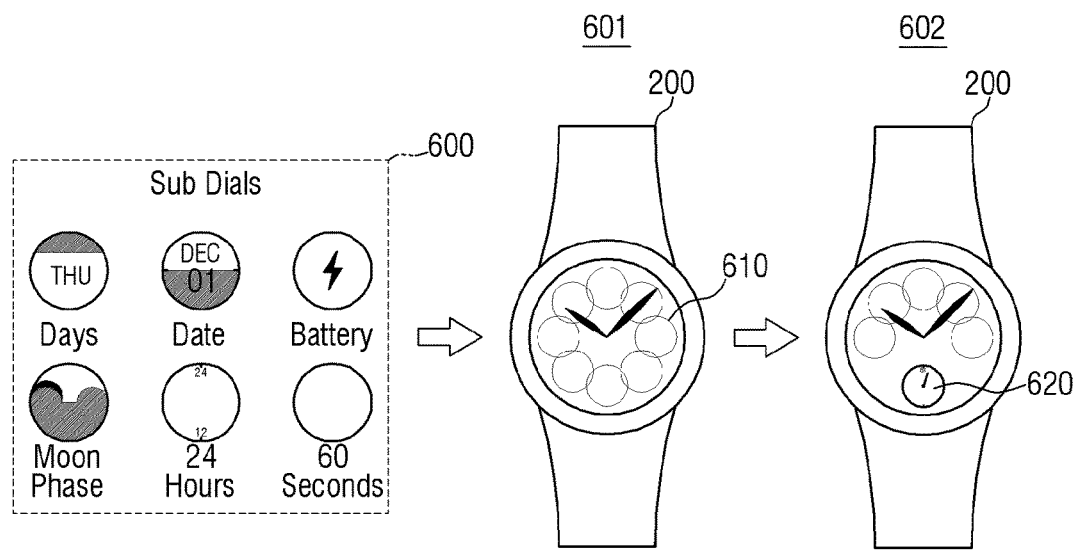
FIG. 6 illustrates sub-dials and watch screen designs to which the sub-dials can be applied.

FIG. 5 illustrates a method of determining a display region for a sub-dial. FIG. 6 illustrates sub-dials and watch screen designs to which the sub-dials can be applied.

More specifically, FIG. 5 illustrates designs 501, 502, 503, and 504, which show exemplary random watch screen designs. Referring to FIG. 5, a random watch screen generated by the apparatus 100 may include sub-dial A (510).

Referring again to FIG. 3, in S40, the apparatus 100 may determine a first region from among one or more sub-dial display regions in the user-preferred watch screen design where one or more sub-dials are arranged as a display region for sub-dial A (510).

That is, once at least one user-preferred watch screen design is determined in S10, the apparatus 100 may identify at least one sub-dial included in the user-preferred watch screen design based on tag information. Also, the apparatus 100 may identify the region in the user-preferred watch screen design where the identified sub-dial is arranged. If there are multiple sub-dials included in the user-preferred watch screen design, the apparatus 100 may identify the types of the multiple sub-dials and the regions where the multiple sub-dials are respectively arranged.

If the number of times tag information has been acquired for the sub-dial identified from the user-preferred watch screen design exceeds a predefined number, the apparatus 100 determine the sub-dial identified from the user-preferred watch screen design as an element for forming a random watch screen design.

In a case in which the sub-dial identified from the user-preferred watch screen design and having tag information acquired therefor more than the predefined number of times is, for example, sub-dial A (510), the apparatus 100 may determine sub-dial A (510) as an element for forming a random watch screen design, and may determine the region in the user-preferred watch screen where sub-dial A (510) is arranged as a display region for sub-dial A (510) in a random watch screen design.

Referring to the design 501, the apparatus 100 may generate a random watch screen design including sub-dial A (510).

Referring to the designs 502 and 503, in a case in which the sub-dials identified from the user-preferred watch screen design include both sub-dial A (510) and sub-dial B (520), a random watch screen including both sub-dial A (510) and sub-dial B (520) may be generated. In this case, the apparatus 100 may determine both sub-dial A (510) and sub-dial B (520) as elements for forming a random watch screen design if the number of times tag information of each of sub-dial A (510) and sub-dial B (520) has been acquired exceeds the predefined number.

In this case, the apparatus 100 may determine the correlation between sub-dial A (510) and sub-dial B (520) according to a predefined criterion set between tag information of sub-dial A (510) and tag information of sub-dial B (520).

The predefined criterion may be determined based on tag information regarding various sub-dial categories set by multiple users. For example, if sub-dial A (510) is a sub-dial showing the day of the week and sub-dial B (520) is a sub-dial showing the date, sub-dial A (510) and sub-dial B (520) may be classified into the same sub-dial category, for example, a schedule information providing sub-dial category, in which case, the correlation between sub-dial A (510) and sub-dial B (520) may be determined to be high.

On the other hand, if sub-dial A (510) is a sub-dial showing the day of the week and sub-dial B (520) is a sub-dial showing the humidity, sub-dial A (510) and sub-dial B (520) may be classified into different sub-dial categories, in which case, the correlation between sub-dial A (510) and sub-dial B (520) may be determined to be low.

The apparatus 100 may determine a second region, which is different from the first region, i.e., the display region for sub-dial A (510), as a display region for sub-dial B (520) based on the determined correlation between sub-dial A (510) and sub-dial B (520).

Thereafter, in S40, the apparatus 100 may generate a random watch screen design including sub-dial A (510) in the first region and sub-dial B (520) in the second region.

Referring to the design 502, in a case in which the correlation between sub-dial A (510) and sub-dial B (520) is high, sub-dial A (510) and sub-dial B (520) may be displayed in regions adjacent to each other.

On the other hand, referring to the design 503, in a case in which the correlation between sub-dial A (510) and sub-dial B (520) is low, sub-dial A (510) and sub-dial B (520) may be displayed in regions relatively distant from each other, compared to their counterparts in the design 502. For example, in a case in which the correlation between sub-dial A (510) and sub-dial B (520) is low, sub-dial A (510) and sub-dial B (520) may be displayed in regions that are in symmetry with each other with respect to the center of the watch screen design 503.

The apparatus 100 may determine at least one of the distance and the angle between the first region and the second region based on the correlation between sub-dial A (510) and sub-dial B (520). For example, it is assumed that sub-dial 1 is a sub-dial showing the day of the week, sub-dial 2 is a sub-dial showing the time in another time zone, sub-dial 3 is a sub-dial showing the date, and sub-dial 4 is a sub-dial showing the temperature.

In this case, sub-dial 1 may have a highest correlation with sub-dial 3, a second highest correlation with sub-dial 2, and a lowest correlation with sub-dial 4.

Alternatively, sub-dial A (510) and sub-dial B (520) may be displayed in the same region in a random watch screen design.

That is, the apparatus 100 may determine the first region as a display region for both sub-dial A (510) and sub-dial B (520).

The apparatus 100 may generate a watch screen design having sub-dial A (510) displayed in the first region in the morning and having sub-dial B (520) displayed in the first region in the afternoon. Alternatively, the apparatus 100 may generate a watch screen design in which different sub-dials are displayed in the same region according to the location of the smart watch 200.

More specifically, the apparatus 100 may receive event information for displaying sub-dial A (510) in a watch screen design and event information for displaying sub-dial B (520) in a watch screen design from the user. The type of event information, however, is not particularly limited to time information and the location of the smart watch 200. That is, for example, a watch screen design may be designed to change its sub-dial(s) in response to detection of repeated vibrations by the smart watch 200.

Also, the apparatus 100 may generate event information for displaying a sub-dial based on information acquired from the user's smart watch, i.e., the smart watch 200, without a requirement of user input. More specifically, the apparatus 100 may receive at least one of time information indicating when each sub-dial of the smart watch 200 is in use and the location of the smart watch 200 measured when each sub-dial of the smart watch 200 is in use.

The apparatus 100 may generate a random watch screen design based on the generated event information.

Referring to the design 504, sub-dial A is displayed in a random watch screen design. The apparatus 100 may design a random watch screen design in which sub-dial A can be replaced with another sub-dial according to event information generated in the smart watch 200. More specifically, an image 530 of overlapping sub-dials may be displayed, indicating that another sub-dial can be displayed in the place of sub-dial A.

Referring to FIG. 6, sub-dials 600 include a sub-dial showing the day of the week, a sub-dial showing the date, a sub-dial showing battery information, a sub-dial showing the moon phase, a sub-dial showing the time in another time zone, and a seconds sub-dial. Each of the sub-dials 600 may have at least one tag information. The sub-dials 600 may be stored in advance in the storage 104 of the apparatus 100.

The apparatus 100 may identify information regarding one or more sub-dial display regions in the user-preferred watch screen design. Referring to a design 601, the apparatus 100 may identify a plurality of sub-dial display regions 610 from the user-preferred watch screen design. If at least one of the sub-dials included in the user-preferred watch screen design is determined as an element for forming a random watch screen design, the apparatus 100 may arrange the determined sub-dial in one of the sub-dial display regions 610. More specifically, the apparatus 100 may determine one of the sub-dial display regions 610 as a display region for the determined sub-dial based on the location of the determined sub-dial in the user-preferred watch screen design. Referring to a design 602, a sub-dial 620 may be displayed in one of the sub-dial display regions 610.

Figure 7:
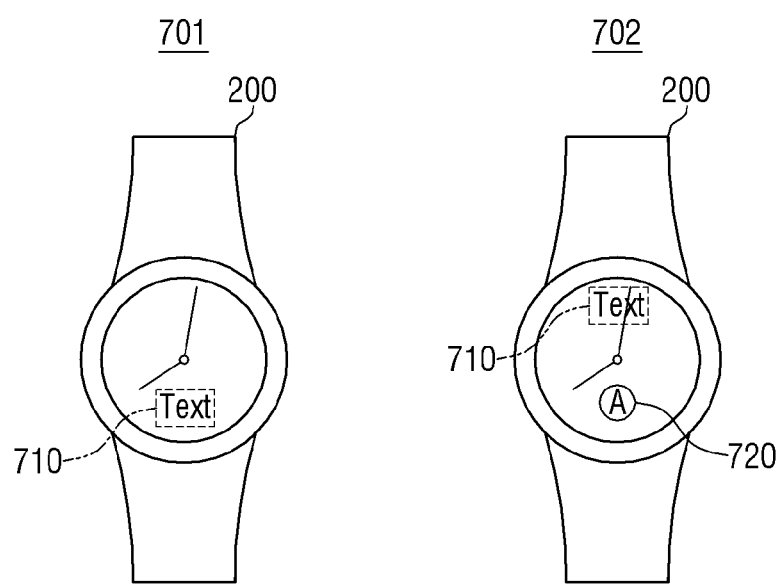
FIG. 7 illustrates a method of determining a display region for text.

FIG. 7 illustrates a method of determining a display region for text. More specifically, FIG. 7 illustrates designs 701 and 702, which show watch screen designs each having text 710 as an element.

According to the present exemplary embodiment, elements that can form a random watch screen design may include text. The apparatus 100 may generate a watch screen design having text displayed in a particular region thereof according to user input. The text may be text directly received from the user.

Watch screen designs having text as an element may be registered in the apparatus 100 in advance, and may be determined as the user-preferred watch screen design in S10.

Referring to the design 701, the apparatus 100 may generate a random watch screen design having text 710 displayed in a predefined text display region in S40. In a case in which the design 701 is applied to the smart watch 200, the smart watch 200 may display the text 710 in the design 701.

The design 702 shows an exemplary random watch screen design having at least one sub-dial as an element. More specifically, in S40, the apparatus 100 may generate a random watch screen design having the text 710 displayed in a region not overlapping with the region where at least one sub-dial 720 is arranged. The apparatus 100 may determine the correlation between the text 710 and the sub-dial 720 and may arrange the text 710 and the sub-dial 720 based on the determined correlation in the same manner as that described above with reference to the designs 502 and 503 of FIG. 5.

FIG. 8 illustrates tag information. More specifically, FIG. 8 shows not only tag information indicating the type and the detailed model of each watch screen design element, but also tag information indicating the attributes of each watch screen design element. That is, referring to FIG. 8, each watch screen design element (or each detailed model of each watch screen design element) may have tag information indicating their attributes. The tag information indicating the attributes of each watch screen design element may be tag information indicating the graphic design elements of each watch screen design element such as shape, color, and texture. Also, the tag information indicating the attributes of each watch screen design element may be tag information indicating an emotion, mood, or style represented by each watch screen design element.

For example, in a case in which a set of hands with tag information "hands 1" has a retro design, tag information "retro" may be added to the set of hands with the tag information "hands 1". In a case in which the user manually generates a watch screen design via the apparatus 100, tag information indicating the attributes of each watch screen design element may be generated according to user input. That is, the user may set, for example, tags "retro" and "metallic", for a set of hands and according to the setting tags by user, tag information of the corresponding set of hands may be registered.

The apparatus 100 may use previously-registered tag information in the process of generating a random watch screen design. FIG. 8 illustrates an example in which tags are already registered in the apparatus 100, but the present disclosure is not limited thereto. That is, various hash tags generated by the user can also be registered in the apparatus 100.

Figure 9:
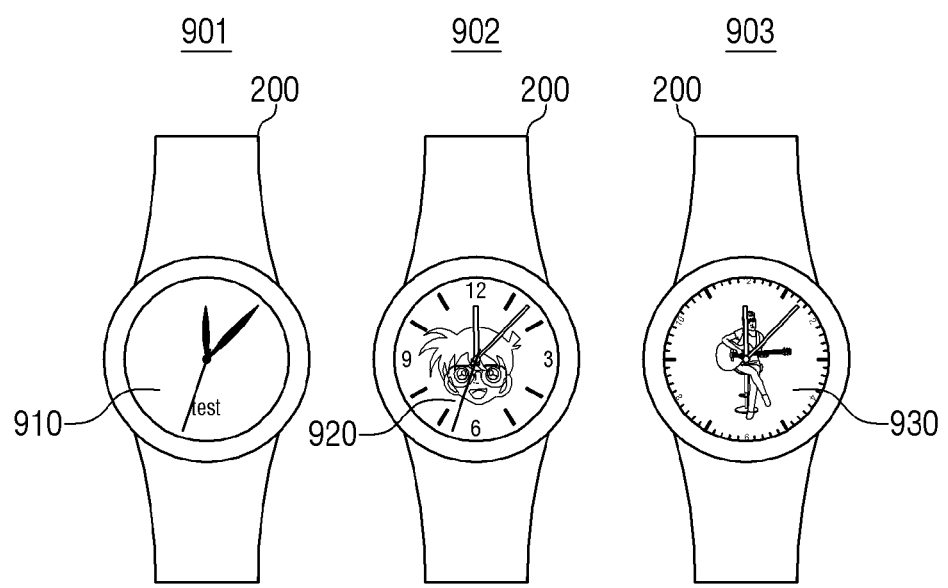
FIG. 9 illustrates a watch screen design element that changes in response to an event.

FIG. 9 illustrates a watch screen design element that changes in response to an event. More specifically, FIG. 9 illustrates designs 901, 902, and 903, which show exemplary watch screen designs having different background images for different events.

It is assumed that a plurality of background images are determined as elements for forming a random watch screen design in S30. That is, in general, only one background image is displayed in a background image display region in a watch screen design, but a plurality of background images may be determined in S30.

In S40, the apparatus 100 may generate a random watch screen design having one of the plurality of background images displayed in a background image display region thereof in response to detection of an event by the smart watch 200.

The apparatus 100 may identify a plurality of background images from the user-preferred watch screen design as elements of the user-preferred watch screen design. More specifically, the apparatus 100 may identify a plurality of background images each having more than the predefined number of tags from the user-preferred watch screen design based on the watch screen design evaluation history and the watch screen design generation history of the user. Then, the apparatus 100 may determine the identified background images as elements for forming a random watch screen design.

The apparatus 100 may generate a matching event for a background image to be output. More specifically, the apparatus 100 may receive feedback information from the smart watch 200 for a predefined amount of time. The feedback information may include information input from the user to the smart watch 200 and information regarding the user's life pattern, detected by the smart watch 200. For example, in response to a particular location being detected during a particular period of time during the day, the smart watch 200 may determine the particular period of time as the user's work hours and the particular location as the user's workplace. Also, the smart watch 200 may acquire information regarding the user's life pattern by detecting, for example, any leisure activities of the user during a particular period of time on a particular day of the week. The information regarding the user's life pattern may be acquired based on time information, location information, and various other information such as particular text in messages.

The apparatus 100 may generate event information by collecting feedback information from the smart watch 200.

The apparatus 100 may also generate event information based on the watch screen design evaluation history and the watch screen design generation history of the user. For example, in a case in which the user enters a hash tag "#workplace" in connection with other users' background image, the apparatus 100 may determine the corresponding background image as a background image to be output at the user's workplace during work.

In this manner, the apparatus 100 may generate a watch screen design having different background images for different periods of time and/or for different locations.

Referring to FIG. 9, the design 901 shows an exemplary watch screen design having a background image 910 that can be displayed during work, the design 902 shows an exemplary watch screen design having a background image 920 that can be displayed at the user's home before or after work, and the design 903 shows an exemplary watch screen design having a background image 930 that can be displayed at a place other than the user's home or workplace before or after work. Once a watch screen design is applied to the smart watch 200, the smart watch 200 may detect an event by monitoring its time and location information, and may output one of the background images 910, 920, and 930 that is previously matched to the detected event.

Figure 10:
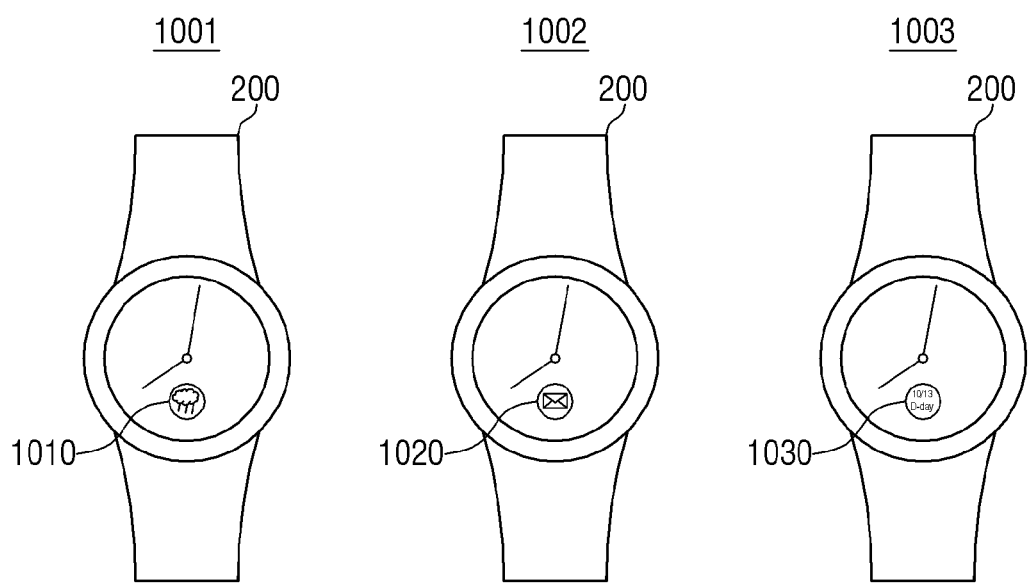
FIG. 10 illustrates widgets that can be displayed in a sub-dial display region.

FIG. 10 illustrates widgets that can be displayed in a sub-dial display region.

The apparatus 100 may acquire information regarding at least one widget stored in the smart watch 200 in advance from the smart watch 200.

The apparatus 100 may determine the widget as a sub-dial, which can be determined as an element for forming a random watch screen design.

In S40, the apparatus 100 may generate a random watch screen design having a widget executed in a sub-dial display region thereof.

An example in which a random watch screen design generated by the apparatus 100 is applied to the smart watch 200 will hereinafter be described with reference to FIG. 10. FIG. 10 illustrates designs 1001, 1002, and 1003, which show exemplary random watch screen designs that can be applied to the smart watch 200.

Referring to the design 1001, the smart watch 200 may display and execute a weather widget in a sub-dial 1010.

Referring to the design 1002, the smart watch 200 may display and execute a message widget in a sub-dial 1020.

Referring to the design 1003, the smart watch 200 may display and execute a calendar widget in a sub-dial 1030.

The apparatus 100 may receive watch screen design information generated by other users designated by the user. In this case, in S10, the apparatus 10 may determine the user-preferred watch screen design based on the received watch screen design information.

The apparatus 100 may identify the accounts of the designated other users and may identify watch screen designs registered to the accounts of the designated other users. Thereafter, the apparatus may identify elements included in each of the identified watch screen designs and may determine the user-preferred watch screen design based on the identified elements. Thereafter, the apparatus 100 may perform S20, S30, and S40 using the user-preferred watch screen design determined based on the identified elements.

The generation of a watch screen design by the apparatus 100 based on the watch screen design evaluation history and the watch screen design generation history of the user has been described above. Alternatively, the apparatus 100 may generate a random watch screen design regardless of the watch screen design evaluation history and the watch screen design generation history of the user.

It is assumed that the apparatus 100 receives a request for the generation of a random watch screen design from the user via the interface for generating a watch screen design.

In response to receipt of the request, the apparatus 100 may determine elements for forming a random watch screen design from among a plurality of previously-registered elements. Also, the apparatus 100 may generate a random watch screen design by combining the determined elements and may transmit the random watch screen design to a smart watch, connected thereto via a network interface, upon receiving a selection of the random watch screen design.

The apparatus 100 may randomly determine the elements for forming a random watch screen design without consideration of their weighted values.

Alternatively, the apparatus 100 may generate a random watch screen design with reference to watch screen design generating histories of other users who have similar user information to the user.

More specifically, the apparatus 100 may receive user information and may search for a user whose user information falls within a predefined range of similarity to the received user information. For example, if user A is a 30 year-old male playing basketball as a hobby, the apparatus 100 may search for a user who has similar user information to user A. The predefined range of similarity to the received user information may be set based on the corresponding user's age and hobby. For example, if there is user B who is a 34-year old male playing baseball as a hobby, user B may be determined to have user information that falls within the predefined range of similarity to user information of user A because users A and B are both in their thirties and both play sports as a hobby.

Once a user whose user information falls within the predefined range of similarity to the received user information is found from among a number of previously-registered users, the apparatus 100 may acquire a watch screen design generating history of the found user. Then, the apparatus 100 may determine elements for forming a random watch screen design based on the acquired watch screen design generating history.

The apparatus 100 may receive feedback information from the smart watch 200. That is, the apparatus 100 may receive information indicating when and how many times each watch screen design generated by the apparatus 100 has been replaced by the user and information indicating when and how many times each element of each watch screen design generated by the apparatus 100 has been replaced by the user as the feedback information.

The apparatus 100 may set weighted values for elements, detected from each random watch screen design generated by the user, based on the feedback information. As a result, the user's preferences on the detected elements may be reflected. Thereafter, in response to a request for the generation of a random watch screen design being received, the apparatus 100 may determine elements for forming a random watch screen design from among the detected elements based on the set weighted values of the detected elements, and may generate a random watch screen design by combining the determined elements.

As the apparatus 100 continues to receive feedback information, the weighted values of the elements of each random watch screen design generated by the user may be updated.

Each of the methods according to the embodiments of the present disclosure that have been described above with reference to the accompanying drawings may be performed by executing a computer program embodied as computer-readable code.

The computer program may be transmitted from a first computing device to a second computing device via a network such as the Internet and may be installed and used in the second computing device. Examples of the first and second computing devices include server devices, stationary computing devices such as a desktop PC, and mobile computing devices such as a tablet PC.

While the present disclosure has been particularly shown and described with reference to exemplary embodiments thereof, it will be understood by those of ordinary skill in the art that various changes in provide and detail may be made therein without departing from the spirit and scope of the present disclosure as defined by the following claims. The exemplary embodiments should be considered in a descriptive sense only and not for purposes of limitation.

What is claimed is:

1. A method for generating a watch screen design, performed by an apparatus for generating a watch screen design, the method comprising:
    determining at least one user-preferred watch screen design from previously-registered watch screen designs, based on at least one of a watch screen design evaluation history and a watch screen design generation history of a user;
    acquiring tag information previously-matched to each element included in the at least one user-preferred watch screen design;
    determining elements to be included in a random watch screen design, based on the acquired tag information; and
    generating the random watch screen design by combining the determined elements,
    wherein the determined elements include a first sub-dial, and
    wherein the generating the random watch screen design comprises:
        determining a first region from regions in the at least one user-preferred watch screen design where at least one sub-dial is arranged, as a display region for the first sub-dial; and
        generating the random watch screen design having the first sub-dial in the first region.

2. The method of claim 1, wherein the determining the elements comprises:
    applying a weighted value to the each element included in the at least one user-preferred watch screen design, based on a number of times that the tag information has been acquired; and
    determining elements having highest weighted values as the elements to be included in the random watch screen design.

3. The method of claim 1, wherein the at least one user-preferred watch screen design comprises first elements and second elements,
    wherein the determining the elements comprises:
    determining an element corresponding to first tag information from the first elements, as one of the elements to be included in the random watch screen design; and
    determining an element corresponding to second tag information which is information on an element that has been included in the at least one user-preferred watch screen design with the element corresponding to the first tag information a greatest number of times, as another one of the elements to be included in the random watch screen design, and
    wherein the generating the random watch screen design comprises generating the random watch screen design including the element corresponding to the first tag information and the element corresponding to the second tag information.

4. The method of claim 1, wherein the determining the elements comprises determining, when the number of times tag information of the first sub-dial has been acquired exceeds a predefined number, the first sub-dial as one of the elements to be included in the random watch screen design.

5. The method of claim 1, wherein the determined elements further include a second sub-dial,
    wherein the determining the first region comprises:
        determining a correlation between tag information of the first sub-dial and tag information of the second sub-dial, according to a predefined criterion; and
        determining a second region, which is different from the first region, as a display region for the second sub-dial, and
    wherein the generating the random watch screen design comprises generating the random watch screen design having the first sub-dial in the first region and the second sub-dial in the second region.

6. The method of claim 5, wherein at least one of a distance and an angle between the first region and the second region is determined based on the determined correlation.

7. The method of claim 1, wherein the determined elements further include a second sub-dial,
    wherein the determining the first region comprises determining the first region as a display region for both the first and second sub-dials, and
    wherein the generating the random watch screen design comprises generating the random watch screen design to display one of the first and second sub-dials in the first region, according to an event detected by a smart watch.

8. The method of claim 7, further comprising:
    receiving, from the smart watch, at least one of time information indicating when the first or second sub-dial of the smart watch is in use and location information of the smart watch when the first or second sub-dial of the smart watch is in use,
    wherein the determining the first region as the display region for both the first and second sub-dials comprises generating event information for displaying each of the first and second sub-dials in the first region, based on the at least one of the time information and the location information, and
    wherein the generating the random watch screen design comprises generating the random watch screen design based on the generated event information.

9. The method of claim 1, further comprising:
    acquiring information regarding a widget stored in a smart watch, from the smart watch; and
    determining the widget as the first sub-dial, and
    wherein the generating the random watch screen design comprises generating the random watch screen design having the widget executed in the first region.

10. The method of claim 1, wherein the determined elements include text,
    wherein the generating the random watch screen design, comprises:
        generating the random watch screen design having the text displayed in a predefined text display region; and
        generating, when the determined elements further include at least one sub-dial, the random watch screen design to display the text in a region which does not overlap with the region where the at least one sub-dial is arranged.

11. The method of claim 1, wherein the determined elements include a plurality of background images, and
    wherein the generating the random watch screen design comprises:

generating the random watch screen design having one of the plurality of background images, which is displayed in a background image display region, in response to an event being detected by a smart watch.

12. The method of claim 1, further comprising:
receiving watch screen design information generated by other users designated by the user,
wherein the determining the at least one user-preferred watch screen design comprises determining the at least one user-preferred watch screen design, based on the received watch screen design information.

13. The method of claim 1, further comprising:
receiving user information;
searching for and retrieving a previously-registered user whose user information falls within a predefined range of similarity to the received user information; and
acquiring a watch screen design generation history of the retrieved previously-registered user,
wherein the determining the elements comprises determining the elements based on the acquired watch screen design generation history.

14. The method of claim 1, further comprising:
providing the random watch screen design to a smart watch connected to the apparatus via a network interface, in response to a selection input for the random watch screen design;
receiving feedback information on the random watch screen design from the smart watch; and
setting a weighted value for each element included in the random watch screen design generated by a user of the smart watch, based on the received feedback information.

15. An apparatus for generating a watch screen design, comprising:
one or more processors;
a memory loading a computer program to be executed by the processors;
a storage storing watch screen design elements and previously-generated watch screen designs; and
a network interface providing the previously-generated watch screen designs to a smart watch,
wherein the computer program comprises:
an operation for determining at least one user-preferred watch screen design from the previously-generated watch screen designs, based on at least one of a watch screen design evaluation history and a watch screen design generation history of a user;
an operation for acquiring tag information previously matched to each element included in the at least one user-preferred watch screen design;
an operation for determining elements to be included in a random watch screen design, based on the acquired tag information; and
an operation for generating the random watch screen design by combining the determined elements,
wherein the determined elements include a first sub-dial, and
wherein the operation for generating the random watch screen design comprises:
an operation for determining a first region from regions in the at least one user-preferred watch screen design where at least one sub-dial is arranged, as a display region for the first sub-dial; and
an operation for generating the random watch screen design having the first sub-dial in the first region.

* * * * *